(12) United States Patent
Doran et al.

(10) Patent No.: US 6,680,787 B1
(45) Date of Patent: *Jan. 20, 2004

(54) OPTICAL COMMUNICATION SYSTEMS

(75) Inventors: Nicholas John Doran, Stratford-Upon-Avon (GB); Peter Neil Kean, Harborne (GB); Finlay MacDonald Knox, Acocks Green (GB)

(73) Assignee: BTG International Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/627,331

(22) Filed: Jul. 27, 2000

Related U.S. Application Data (63) Continuation of application No. 08/971,981, filed on Nov. 17, 1997, now Pat. No. 6,097,524, which is a continuation of application No. PCT/GB96/01172, filed on May 16, 1996.

(30) Foreign Application Priority Data

May 17, 1995 (GB) .............................. 9509938

(51) Int. Cl.[7] .............................................. H04B 10/17
(52) U.S. Cl. ...................... 359/179; 359/161; 359/337; 359/341
(58) Field of Search ................................. 359/179, 337, 359/341, 161, 173, 160, 176, 174, 347, 156; 385/1, 122

(56) References Cited

U.S. PATENT DOCUMENTS

| | | |
|---|---|---|
| 4,778,237 A | 10/1988 | Sorin et al. |
| 5,343,322 A | 8/1994 | Pirio et al. .................. 359/173 |
| 5,471,333 A | 11/1995 | Taga et al. .................. 359/173 |
| 5,488,620 A | 1/1996 | Minden ........................ 372/18 |
| 5,508,845 A | 4/1996 | Frisken ...................... 359/161 |
| 5,513,194 A | 4/1996 | Tamura et al. .................. 372/6 |
| 5,559,910 A | 9/1996 | Taga et al. .................. 359/173 |
| 5,574,590 A | 11/1996 | Edagawa et al. ........... 359/179 |
| 5,577,057 A | 11/1996 | Frisken ........................ 372/18 |
| 5,612,808 A | 3/1997 | Audouin et al. ............ 359/161 |
| 5,629,795 A | 5/1997 | Suzuki et al. ............... 359/337 |
| 5,680,491 A | 10/1997 | Shigematsu et al. ........ 359/161 |
| 5,764,841 A | 6/1998 | Iwatsuki et al. ............ 385/123 |
| 5,798,853 A | 8/1998 | Watanabe .................... 359/160 |
| 5,828,478 A | 10/1998 | Thomine et al. ............ 359/181 |
| 5,898,716 A | 4/1999 | Ahn et al. ....................... 372/6 |
| 5,905,825 A | 5/1999 | Brindel et al. ................. 385/24 |
| 6,097,524 A | * 8/2000 | Doran et al. ................. 359/179 |
| 6,122,088 A | 9/2000 | Hasegawa .................... 359/188 |
| 6,137,604 A | 10/2000 | Bergano ..................... 359/161 |
| 6,243,181 B1 | 6/2001 | Golovchenko et al. ..... 359/161 |
| 6,321,015 B1 | 11/2001 | Doran et al. ................. 385/123 |

FOREIGN PATENT DOCUMENTS

| | | | |
|---|---|---|---|
| EP | 0 609 129 | 8/1994 | |
| EP | 0 777 347 A2 | 6/1997 | |
| EP | 0 777 347 A3 | 4/1998 | |
| EP | 0 846 977 | 6/1998 | ............. G02F/1/35 |
| GB | 2 271 236 | 4/1994 | |
| GB | 2 277 651 | 11/1994 | |
| GB | 2 279 838 | 1/1995 | |
| JP | 2-096120 | 4/1990 | |
| WO | WO 98/36512 | 8/1998 | ........... H04B/10/00 |

OTHER PUBLICATIONS

Zhang et al., Optical Soliton Propagation in a Positively and Negatively Dispersion Allocated Fiber, Communication Technology Proceedings, ICCT1, 1996, pp. 319–322.

(List continued on next page.)

*Primary Examiner*—Leslie Pascal
(74) *Attorney, Agent, or Firm*—Morgan Lewis & Bockius LLP (57) ABSTRACT

A return-to-zero pulse optical communication system includes fast saturable absorber means (F1,DSF) to provide substantially zero average dispersion in a single amplifier span (SIF,DSF) to reduce the effect of timing jitter an provide considerably enhanced propagation distances.

34 Claims, 2 Drawing Sheets

OTHER PUBLICATIONS

Suzuki et al., Reduction of Gordon–Haus Timing Jitter by Dispersion Compensation in Soliton Transmission, Electronic Letters 31, 1995, pp. 1–7 and Figures 1–3.

Nakazawa et al., Nonlinear Pulse Transmission Through an Optical Fiber at Zero–Average Group Velocity Dispersion, IEEE Photonics Technology Letters, vol. 8, No. 3, Mar. 1996, pp. 452–454.

Smith et al., Reduced Gordon–Haus Jitter Due to Enhanced Power Solitons in Strongly Dispersion Managed Systems, Electronic Letters, vol. 32, No. 22, Oct. 24, 1994, pp. 2085–2086.

Smith et al., Enhanced Power Solitons in Optical Fibers with Periodic Dispersion Management, Electronics Letters, vol. 32, No. 1, Jan. 4, 1996, pp. 54–55.

Golovchenko et al., Collision–induced Timing Jitter Reduction by Periodic Dispersion Management in Soliton WDM Transmission, Electronics Letters, vol. 33, No. 9, Apr. 24, 1997, pp. 735–736.

Forysiak et al., Stepwise Dispersion Profiling of Periodically Amplified Soliton Systems, Journal of Lightwave Technology, Aug. 12, 1994, No. 8, pp. 1330–1337.

Nakazawa et al., Optical Soliton Communication in a Positively and Negatively Dispersion–Allocated Optical Fibre Transmission Line, Electronics Letters, 31 Feb. 2, 1995, No. 3, pp. 216–217.

Smith et al., Energy–scaling Characteristics of Solitons in Strongly Dispersion Managed Fibers, Optics Letters, vol. 21, No. 24, Dec. 15, 1996, pp. 1981–1983.

Chen et al, "Soliton Fiber ring laser", Optical Society of America, Mar. 15, 1992, pp. 417–419.

Kawai et al, "10Gbit/s optical soliton transmission over 7200 km by using a monolithically integrated MQW–DFB–LD/MQW–EA modlator light source", Electronics Letters, Feb. 3, 1994, pp. 251–252.

D. Atkinson, et al., "Increased amplifier spacing in a soliton system with quantum–well saturable absorbers and spectral filtering", OPTICS LETTERS, vol. 19, No. 19 (Oct. 1, 1994), pp. 1514–1516.

A.M. Niculae, W. Forysiak, and N.J. Doran, INSPEC Abstract Number: A2000–4265S–019, B2000–03–4340S–030: "Optical Amplifier location in strong dispersion–managed soliton systems", Conference on Lasers and Electro–Optics CLEO '99) (IEEE Cat. No. 99CH37013) (1999), pp. 236–237.

S.B. Alleston, P. Harper, I.S. Penketh, I. Bennion, and N.J. Doran, INSPEC Abstract Number: A2000–024280S–032, B2000–01–6260F–038: "1220 km propagation of 40 Gbit/s single channel RZ data over dispersion managed standard (non–dispersion shifted) fibre", Cat. No. 99CH36322 (1999), Suppl. Publication, p. PD3–1 –PD3–3.

S.B. Alleston, P. Harper, I.S. Penketh, I. Bennion, and N.J. Doran, INSPEC Abstract Number: B1999–03–6260M–005: "40 Gbit/s single channel dispersion managed pulse propagation in standard fibre over 509 km", Electronics Letters, vol. 35, No. 1 (Jan. 7, 1999), pp. 57–59.

S.B. Alleston, P. Harper, I.S. Penketh, I. Bennion, N.J. Doran, and A.D. Ellis, INSPEC Abstract Number: B1999–06–6260M–059, 40 Gbit/s soliton transmission over dispersion managed standard fibre links, IEEE Colloquium on High Speed and Long Distance Transmission (Ref. No. 1999/022) (1999), pp. 2/1–2/4.

S.B. Alleston, P. Harper, I.S. Penketh, I. Bennion, N.J. Doran, and A.D. Ellis, INSPEC Abstract Number: B1999–08–6260F–001: "1000 km transmission of 40 Gbit/s single channel RZ data over dispersion managed standard (non–dispersion shifted) fibre", Electronics Letters, vol. 35, No. 10 (May 13, 1999), pp. 823–824.

S. Alleston, I. Penketh, P. Harper, A. Niculae, I. Bennion, and N.J. Doran, INSPEC Abstract Number: B1999–12–6260–005: "16000KM 10 Gbits$^{-1}$ soliton transmission over standard fibre by reduction of interactions through optimum amplifier positioning", Cat. No. 99CH36322, vol. 2 (1999), pp. WC4–1/41 –WC4–3/43.

A. Bernstson, D. Anderson, N.J. Doran, W. Forysiak, and J.H.B. Nijhof, INSPEC Abstract Number: B9812–6260–227: "Power dependence and accessible bandwidth for dispersion–managed solitons in asymmetric dispersion maps", Electronics Letters, vol. 34, No. 21 (Oct. 15, 1998), pp. 2054–2056.

A. Bernstson, N.J. Doran, W. Forysiak, and J.H.B. Nijhof, INSPEC Abstract Number: A9818–426S–003, B9809–4340–086, "Power dependence of dispersion–managed solitons for anomalous, zero and normal path–average dispersion", Optics Letters, vol. 23, No. 12 (Jun. 15, 1998), pp. 900–902.

K.J. Blow and N.J. Doran, Genuine Article No. EW885, "Solitons Across The Atlantic", Physics World, vol. 4, No. 2 (Feb. 1991), pp. 33–34.

K.J. Blow and N.J. Doran, INSPEC Abstract Number: A82102951, B82059670, "High bit rate communication systems using non–linear effects", Optics Communications, vol. 42, No. 6 (Aug. 15, 1982), pp. 403–406.

K.J. Blow and N.J. Doran, INSPEC Abstract Number: B83040547, "Bandwidth limits of nonlinear (soliton) optical communication systems", Electronics Letters, vol. 19, No. 11 (May 26, 1983), pp. 429–430.

K.J. Blow and N.J. Doran, INSPEC Abstract Number: A84044149: "Global and local chaos in the pumped nonliner Schrödinger equation", Physical Review Letters, vol. 52, No. 7 (Feb. 13, 1984), pp. 526–529.

K.J. Blow and N.J. Doran, INSPEC Abstract Number: A850409959: "Multiple dark soliton solutions of the non–linear Schrödinger equation", Physics Letters A, vol. 107A, No. 2 (Jan. 14, 1985), pp. 55–58.

K.J. Blow and N.J. Doran, INSPEC Abstract Number: A85053890, "The asymptotic dispersion of soliton pulses in lossy fibres", Optics Communications, vol. 52, No. 5 (Jan. 1, 1985), pp. 367–370.

K.J. Blow and N.J. Doran: INSPEC Abstract Number: A87103907, B87054402, "Nonlinear effects in optical fibres and fibre devices", IEEE Proceedings, vol. 134, Pt. J, No. 3 (Jun. 1987), pp. 138–144.

K.J. Blow and N.J. Doran, INSPEC Abstract Number: A91120943: "Average soliton dynamics and the operation of soliton systems with lumped amplifiers", IEEE Photonics Technology Letters, vol. 3, No. 4 (Apr. 1991), pp. 369–371.

K.J. Blow and N.J. Doran, and S.J.D. Phoenix, INSPEC Number: A9211–4265–001, "The soliton phase", Optics Communications, vol. 88, No. 2,3 (Mar. 15, 1992), pp. 137–140.

K.J. Blow, N.J. Doran, and D. Wood: INSPEC Abstract Number: A88043167, B88020371, "Trapping of energy into solitary waves in amplified nonlinear dispersive systems", Optics Letters, vol. 12, No. 12 (Dec. 1987), pp. 1011–1013.

K.J. Blow, N.J. Doran, and D. Wood: INSPEC Abstract Number: A88060956, B88033651: "Generation and stabilization of short soliton pulses in the nonlinear Schrödinger equation", *J. Opt. Soc. Am. B*, vol. 5, No. 2 (Feb. 1988), pp.381–391.

J.F. Devaney, W. Forysiak, and N.J. Doran, INSPEC Abstract Number: A9803–4265S–004, B9802–4340–021: "Soliton collisions in dispersion–managed WDM systems", Communications 23rd European Conference on Optical Communications IOOC–ECOC '97 (Conf. Publ. No. 448), vol. 3 (Sep. 22-25, 1997), pp. 223–236.

J.F.L. Devaney, W. Forysiak, and N.J. Doran, INSPEC Abstract Number: B1999–07–6260M–022: "Reduction of collision induced timing jitter in multichannel soliton systems by dispersion management", *ECOC '98*, IEEE Cat. No. 98TH8398, vol. 1 (Sep. 20–24, 1998), pp. 89–90.

J.F.L. Devaney, W. Forysiak, A.M. Niculae, and N.J. Doran, INSPEC Abstract Number: A9803–4280s–015, B9802–6260–024: "Soliton collisions in dispersion–managed wavelength–division–multiplexed systems", *Optics Letters*, vol. 22, No. 22 (Nov. 15, 1997), pp. 1695–1697.

J.F.L. Devaney, W. Forysiak, N.J. Smith, and N.J. Doran, INSPEC Abstract Number: B9706–6260–081: "Modeling WDM soliton transmission in dispersion–managed systems", IEEE Colloquium on WDM Technology and Applications (Ref. No. 1997/036) (1997), pp. /4/1—4/4.

J.F.L. Devaney, Y. Forysiak, N.J. Smith, and N.J. Doran, INSPEC Abstract Number: B9808–6260–180: "WDM of enhanced power solitons in strongly dispersion–managed systems", *OFC '97 Technical Digest*, vol. 6 (1997) (IEEE Cat. No. 97CH36049), pp. 306–307.

N.J. Doran, E.I. No. EIP02016818279: "Soliton communications systems: The concept is alive", Conference Proceedings—Lasers and Electro–Optics Society Annual Meeting—LEOS, vol. 1, IEEE Cat. No. 01CH37242 (2001), pp. 214–215.

N.J. Doran, E.I. No. EIP98044174957: "Dispersion–managed solitons: a new paradigm for high data rate", *OFC '98 Technical Digest*, IEEE Cat. No. 98CH36177, p. 265.

N.J. Doran, Genuine Article No. HC722, "Solitons the key to global cheap–talk", *Physics World*, vol. 5, No. 5, No. 2 (Feb. 1992), p. 25.

N.J. Doran, Inside Conference Item ID: CN008356099, "Nonlinear Phenomena in Optical Fibres", *NATO ASI Series E Applied Sciences*, vol. 289 (1995), pp. 75–102.

N.J. Doran, INSPEC Abstract Number: A1999–14–4280S–012, B1999–07–6260M–024: "Dispersion managed soliton systems", *ECOC '98*, IEEE Cat. No. 98TH8398, vol. 1 (Sep. 20–24, 1998), pp. 97–99.

N.J. Doran: INSPEC Abstract Number: A86090313, B86048178: "Nonlinear pulse propagation in optical fibres ", *IOOC—ECOC '85*, vol. 2, pp. 157–164.

N.J. Doran, INSPEC Abstract Number: A9421–4282–014, B9411–4125–034: "All–optical control and future opportunities for ultra high speed transmission on optical fibres", *EFOC & N '94*, pp. 5–7.

N.J. Doran and K.J. Blow, INSPEC Abstract Number: A84049551, B84025386: "Solitons in optical communications", *IEEE Journal of Quantum Electronics*,vol. QE–19, No. 12 (Dec. 1983), pp. 1883–1888.

N.J. Doran and W. Forysiak, INSPEC Abstract Number: A9404–4265F–015, B9402–4340–092: "Optimizing the capacity of soliton systems", *IEE Colloquium on 'Ultra–Short Optical Pulses'*, Digest No. 1993/202 (1993), pp. 10/1 10/2.

N.J. Doran and W. Forysiak, INSPEC Abstract Number: A9518–4265S–012, B9510–4340–083: "Phase conjugation for jitter and soliton—soliton compensation in soliton communications", CLEO '94, Summaries of Papers Presented at the Conference on Lasers and Electro–Optics, Technical Digest Series, Conference Edition, Cat. No. 94CH3463–7, VOL. 8 (1994), pp. 367–368.

N.J. Doran, W. Forysiak, P. Harper, S.B. Alleston, S.K. Turitsyn, and D. Govan,INSPEC Abstract Number: A2000–02–4281–021, B2000–01–4125–102: "The dispersion management of solitons", *ACOFT/AOS '99*, pp. 5–9.

N.J. Doran, W. Forysiak, F.M. Knox, N.J. Smith, and I. Bennion, INSPEC Abstract Number: A9610–4280S–003, B9605–6260–186: "Optimizing transmission capacity: long distance and terrestrial applications", *Phil. Trans. R. Soc. Lond. A*, vol. 354, No. 1708 (Mar. 15, 1996), pp. 679–694.

N.J. Doran, W. Forysiak, J.H.B. Nijhof, A.M. Niculae, A. Bernston, Inside Conference Item ID: CN025778248: "Remarkable Features of DM Solitons: Implications for High Speed and WDM Systems", *New Trends in Optical Soliton Transmission Systems*, vol. 5 (1998), pp. 303–316.

N.J. Doran, W. Forysiak, J.H.B. Nijhof; A. Niculae, 02503004 Inside Conference Item ID: CN026121447: "Remarkable properties of dispersion managed solitons", *OSA Technical Digest Series*, vol. 5(Mar. 29–30, 1998), p. WSB1.

N.J. Doran W. Forysiak, N.J. Smith, and J.F.L. Devaney, E.I. No.: EIP97083773098: "Soliton dynamics in periodically varying dispersion system", QELS '97, IEEE Cat. No. 97CB36111, vol. 12, pp. 55–56.

N.J. Doran, W. Forysiak, N.J. Smith, F.M. Knox, and K.M. Allen, INSPEC Abstract Number: a9518–4265S–003, B9510–6260–024, "Design of soliton systems for optimum capacity", *Pure Appl. Opt.*, vol. 4 (Jul. 1995), pp. 271–279.

N.J. Doran, N.J. Smith, W. Forysiak, and F.M. Knox, Inside Conference Item ID: CN015687880: "Dispersion As Control Parameter in Soliton Transmission Systems", *Physics and Applications of Optical Solitons in Fibres '95*, vol. 3 (1996), pp. 1–14.

N.J. Doran, N.J. Smith, W. Forysiak, and F.M. Knox, "Dispersion as Control Parameter in Soliton Transmission Systems"Physics and Applications of Optical Solitons in Fibres '95: Proceedings of the Symposium held in Kyoto, Japan (Nov. 14–17, 1995), pp. 1–14.

N. Edagawa, I. Morita, M. Suzuki, S. Yamamoto, H. Taga, and S. Akiba: "20Gbit/s, 8100 km straight–line single channel soliton–based RZ transmission experiment using periodic dispersion compensation", *Proc. 21st Euro. Conf. on Opt. Comm. (ECOC '95 –Brussels*, pp. 983–986.

A.D. Ellis, J.D. Cox, D. Bird, J. Regnault, J.V. Wright, and W.A. Stallard, et al., "5 Gbit/s soliton propagation over 350 km with large periodic dispersion coefficient perturbations using erbium doped fiber amplifier repeaters", *Electronic Letters*, vol. 27, No. 10 (May 9, 1991), pp. 878–880.

W. Forysiak and N.J. Doran, Inside Conference Item ID: CN000566111: Stepwise dispersion profiling of periodically amplified soliton systems, *Technical Digest Series—Optical Society of America (OSA)*, vol. 15 (1993), pp. TuA4–1/170—TuA4–4/173.

W. Forysiak, K.J. Blow, and N.J. Doran, INSPEC Abstract Number: B9310–6260–036: "Reduction of Gordon–Haus jitter by post–transmission dispersion compensation", *Electronics Letters*, vol. 29, No. 13 (Jun. 24, 1993), pp. 1225–1226.

W. Forysiak, J.F.L. Devaney, N.J. Smith, and N.J. Doran, INSPEC Abstract Number: A9714–4281–008, B9707–6260–082: "Dispersion management for wavelength–division–multiplexed soliton transmission", *Optics Letters*, vol. 22, No. 9 (May 1, 1997), pp. 600–602.

W. Forysiak and N.J. Doran, INSPEC Abstract Number: A9514–4280S–015, B9508–6260–034: "Reduction of Gordon—Haus jitter in soliton transmission systems by optical phase conjugation", *Journal of Lightware Technology*, vol. 13, No. 5 (May 1995), pp. 850–855.

W. Forysiak, N.J. Doran, F.M. Knox, and K.J. Blow, INSPEC Abstract Number: A9514–4265S–002, B9508–4340–012 "Average soliton dynamics in strongly perturbed systems", *Optics Communications*, vol. 117 (May 15, 1995), pp. 65–70.

W. Forysiak, F. M. Knox, and N.J. Doran, INSPEC Abstract Number: A9408–4281–011, B9404–4125–026: "Average soliton propagation in periodically amplified systems with stepwise dispersion–profiled fiber", *Optics Letters*, vol. 19, No. 3 (Feb. 1, 1994), pp. 174–176.

W. Forysiak, F. M. Knox, and N. J. Doran INSPEC Abstract Number: A9422–4265–012, B9411–4340–074: "Stepwise dispersion profiling of periodically amplified soliton systems", *Journal of Lightwave Technology*, vol. 12, No. 8 (Aug. 1994), pp. 1330–1337.

W. Forysiak, J.H.B. Nijhof, and N.J. Doran, INSPEC Abstract Number: A2000–16–4281–008, B2000–08–4125–043: "Dispersion managed solitons: the key to terabit per second optical fiber communication systems", *Optics & Photonics News*, vol. 11, No. 5 (May 2000), pp. 35–39.

I.R. Gabitov and S.K. Turitsyn, "Breathing Soliton in Cascaded Transmission System with Passive Dispersion Compensation", Physics and Applications of Optical Solitons in Fibres '95: Proceedings of the Symposium held in Kyoto, Japan (Nov. 14–17, 1995), pp. 365–373.

D.S. Govan, W. Forysiak, and N.J. Doran, Inside Conference Item ID: CN026120765: "40Gbit/s soliton transmission over standard fiber with dispersion management", *OSA Technical Digest Series*, vol. 5 (1998), p. NWE10–1/89 –NWE10–3/91.

D.S. Govan, W. Forysiak, and N.J. Doran, Inside Conference Item ID:CN030112236: "40 Gbit/s RZ transmission over more than 2000 km of standard fibre with dispersion management", Colloquium Digest—IEE (1999), Issue 22, pp. 3/1–3/6.

D.S. Govan, W. Forysiak, and N.J. Doran, INSPEC Abstract Number: A9901–4280S–011, B9901–6260C–006: "Long–distance 40 Gbit/s soliton transmission over standard fiber by use of dispersion management", *Optics Letters*, vol. 23, No. 19 (Oct. 1, 1998), pp. 1523–1525.

D.S. Govan, N.J. Smith, F.M. Knox, and N.J. Doran, INSPEC Abstract Number: A9802–4281–004, B9801–4125–040: "Stable propagation of solitons with increased energy through the combined action of dispersion management and periodic saturable absorption", *J. Opt. Soc. Am. B*, vol. 14, No. 11 (Nov. 1997), pp. 2960–2966.

D.S. Govan, S.K. Turitsyn, and N.J. Doran, INSPEC Abstract Number: B2001–02–6260F–054: "40–Gbit/s dispersion–managed soliton transmission over 3000 km of standard fiber through optimization of the dispersion map parameters", CLEO 2000, Cat. No. 00CH37088, pp. 238–239.

A. Hasegawa (Ed.), "Physics and Applications of Optical Solitons in Fibres '95"Proceedings of the Symposium held in Kyoto, Japan, Nov. 14–17, 1995, *Solid–State Science and Technology Library*, Table of Contents.

A. Hasegawa and Y. Kodama, Guiding–center soliton in fibers with periodically varying dispersion, *Optics Letters*, vol. 16, No. 18 (Sep. 15, 1991), pp. 1385–1387.

P. Harper, S.B. Alleston, I. Bennion, and N.J.Doran, INSPEC Abstract Number: B2000–02–6260F–003: "40 Gbit/s dispersion managed soliton transmission over 1160 km in standard fibre with 75 km span length", *Electronics Letters*, vol. 35, No. 24 (Nov. 25, 1999), pp. 2128–2130.

P. Harper, S.B. Alleston, and N.J. Doran, Inside Conference Item ID: CN037961966: "80 Gbit/s RZ Transmission over 523 km Using Dispersion Compensated Standard Fibre", 26th European Conference on Optical Communication (2000), vol. 2, pp. 143–145 VDE.

P. Harper, S.B. Alleston, W. Forysiak, and N.J. Doran, INSPEC Abstract Number: B2001–02–6260C–035: "10 Gbit/s dispersion–managed soliton transmission over 13,400 km in a weak symmetric non–zero dispersion shifted fiber dispersion map", CLEO 2000, *TOPS*, vol. 39 (IEEE Cat. No. 00CH37088) (2000), pp. 237–238.

P. Harper, S.B. Alleston, D.S. Govan, W. Forysiak, I. Bennion, and N.J. Doran, Inside Conference Item ID: CN036435057: "40 Gbit/s Recirculating Loop Experiments on Dispersion Managed Standard Fibre", Solid State Science and Technology Library (2000), vol. 6, pp. 387–401.

P. Harper, S.B. Alleston, I.S. Penketh, D.S. Govan, I. Bennion, A.D. Ellis, and N.J. Doran, INSPEC Abstract Number: B2000–07–6260F–012: "40 Gbit/s nonlinear RZ pulse propagation over 900 km with a 75 km standard fibre span using dispersion compensation: optimization of the launch position", *ECOC '99*, Conference, vol. 1 (Sep. 26–30, 1999), pp. 232–233.

P. Harper, F.M. Knox, D.S. Govan, P.N. Kean, I. Bennion, and N.J. Doran, INSPEC Abstract Number: B9806–6260–126: "Long distance 10 Gbit/s soliton transmission over standard fibre with periodic dispersion ompensation", Core and ATM Networks NOC '97, pp. 18–24.

P. Harper, F.M. Knox, P.N. Kean, I. Bennion, and N.J. Doran, INSPEC Abstract Number: B9806–6260–126: "10Gbit/s soliton propagation over 5250 km in standard fiber with dispersion compensation", *OFC '97 Digest*, vol. 6 IEEE Cat. No. 97CH36049, PP. 304–305.

P. Harper, F.M. Knox, P.N. Kean, L. Zhang, N.J. Doran, and I. Bennion, INSPEC Abstract Number: A9612–4265S–016, B9607–4340–039: "Soliton transmission over 2700 km using an in fibre Bragg grating filter to give Gordon–Haus jitter reduction", IEE Colloquium on Optical Solitons: Principles and Applications (Digest No. 1996/090) (1996), pp. 8/1–8/4.

P. Harper, F.M. Knox, P.N. Kean, L. Zhang, N.J. Doran, and I. Bennion, E.I. No.: EIP96110399059: "Jitter suppression in a 2700 km soliton propagation experiment using only a fibre Bragg grating filter", Conference on Lasers and Electro–Optics Europe—Technical Digest, CThF3 (1996), p. 245.

P. Harper, I.S. Penketh, S.B. Alleston, I. Bennion, and N.J. Doran, INSPECT Abstract Number: B9812–6260–152: "10 Gbit/s dispersion managed soliton propagation over 200 Mm without active control", *Electronics Letters*, vol. 34, No. 21 (Oct. 15, 1998), pp. 1997–1999.

P. Harper, I.S. Penketh, S.B. Alleston, and N.J. Doran, INSPEC Abstract Number: A1999–14–4280S–015, B1999–07–6260=011: "200 000 km 10 Gbit/s soliton propagation exploiting periodic saturable absorption", *ECOC '98*, IEEE Cat. No. 98TH8398), vol. 1 (Sep. 20–24, 1998), pp. 107–108.

P. Harper, I.S. Penketh, and N.J. Doran, INSPEC Abstract Number: A9820–4281–012, B9810–4125–043: "Dispersion–optimized soliton propagation over 24 000 km in standard fibre using dispersion compensation", Long–Haul, ATM and Multi–Media Networks NOC '98, pp. 244–251.

M.N. Islam, C.E. Soccolich, and J.P. Gordon, "Soliton intensity–dependent polarization rotation", *Optics Letters*, vol. 15, No. 1 (Jan. 1, 1990), pp. 21–23.

S.M.J. Kelly, K. Smith, K.J. Blow, and N.J. Doran, INSPEC Abstract Number: A91141490, B91077790: "Average soliton dynamics of a high–gain erbium fiber laser", *Optics Letters*, vol. 16, No. 17 (Sep. 1, 1991), pp. 1337–1339.

F.M. Knox, W. Forysiak, and N.J. Doran, INSPEC Abstract Number: A9524–4265S–003, B9512–4340–074: "10–Gbit/s soliton communication systems over standard fiber at 1.55 $\mu$m and the use of dispersion compensation", *Journal of Lightware Technology*, vol. 13, No. 10 (Oct. 1995), pp. 1955–1962.

F.M. Knox, W. Forysiak, and N.J. Doran, E.I. No. EP950125817: "Upgrading standard fibre communication links to 10 Gbit/s using solitons and dispersion compensation", *CLEO/EUROPE '94*, IEEE Cat. No. TH0614–8, pp. 279–280.

F.M. Knox, P. Harper, P.N. Kean, and I. Bennion, and N.J. Doran, INSPEC Abstract Number: A9612–4265S–019, B9607–4340–042: "10 Gbit/s soliton transmission over standard fibre", IEE Colloquium on Optical Solitons: Principles and Applications (Digest No. 1996/090), pp. 13/1–13/4.

F.M. Knox, P. Harper, P. Kean, I. Bennion, and N.J. Doran, INSPEC Abstract Number: A9720–4280S–005, B9710–6260–204: "Soliton transmission at 10 Gbit/s over 2022 km of standard fibre with dispersion compensation", 22nd European Conference on Optical Communication—ECOC '96, Oslo, IEEE Cat. No. 96TH8217, vol. 3, WeC.3.2/3.101—WeC.3.2/3.104.

F.M. Knox, P.N. Kean, N.J. Doran, and I. Bennion, INSPEC Abstract Number B9511–4125–030: "Low jitter long distance pulse transmission near net fibre dispersion zero wavelength", *Electronics Letters*, vol. 31, No. 17 (Aug. 17, 1995), pp. 1467–1468.

H. Kubota and M. Nakazawa, "A Dispersion–Allocated Soliton and Its Impact on Soliton Communication", Physics and Applications of Optical Solitons in Fibres '95: Proceedings of the Symposium held in Kyoto, Japan (Nov. 14–17, 1995), pp. 27–36.

H. Kubota and M. Nakazawa, "Partial soliton communication systems", *Optics Communications*, vol. 87, No. 1,2 (Jan., 1, 1992), pp. 15–18.

V.K. Mezentsev, S.K. Turitsyn, and N.J. Doran, INSPEC Abstract Number: B2001–01–6260–002: "System optimization of 80 Gbit/s single channel transmission over 1000 km of standard fibre", *Electronics Letters*, vol. 36, No. 23 (Nov. 9, 2000), pp. 1949–1951.

M. Nakazawa and H, Kubota, "Optical soliton communication in a positively and negatively dispersion–allocated optical fibre transmission line", *Electronics Letters*, vol. 31, No. 3 (Feb. 2, 1995), pp. 216–217.

B.P. Nelson, D. Cotter, K.J. Blow, and N.J. Doran, INSPEC Abstract Number: A83095161, "Large nonlinear pulse broadening in long lengths of monomode fibre", *IEEE*, (1983), p. 7/1–7/3.

B.P. Nelson, D. Cotter, K.J. Blow, and N.J. Doran, INSPEC Abstract Number: A84024075: "Large nonlinear pulse broadening in long lengths of monomode fibre", *Optics Communications*, vol. 48, No. 4 (Dec. 15, 1983), pp. 292–294.

A.M. Niculae, W. Forysiak, and N.J. Doran, 02502966 Inside Conference Item ID: CN026121447: "Remarkable properties of dispersion managed solitons", *OSA Technical Digest Series* vol. 5 (1998), pp. NThD3–1/184–NthD3/186.

A.M. Niculae, W. Forysiak, and N.J. Doran, INSPEC Abstract Number: A1999–10–4280S–033, B1999–05–6260M–072: "Optimal amplifier location in strong dispersion–managed soliton systems", IEE Colloquium Optical Solitons (Ref. No. 1999/016) (1999), p. 8/1–8/4.

A.M. Niculae, W. Forysiak, A.J. Gloag, J.H.B. Nijhof, and N.J. Doran, INSPEC Abstract Number: B9812–6260–236: "Soliton collisions with wavelength–division multiplexed systems with strong dispersion management", *Optics Letters*, vol. 23, No. 23, No. 17( Sep. 1, 1998), pp. 1354–1356.

J.H.B. Nijhof, and N.J. Doran, Inside Conference Item ID: CN03634995: "Symmetry–Breaking and Bistability for Dispersion–Managed Solitons", *Massive WDM and TDM Soliton Transmission Systems* (2000), vol. 6, pp. 299–308.

J.H.B. Nijhof, N.J. Doran, and W. Forysiak, INSPEC Abstract Number: A1999–14–4280S–014, B1999–07–6260F–011: "Dispersion–managed solitons in the normal dispersion regime: a physical interpretation", *ECOC '98*, IEEE Cat. No. 98TH8398), vol. 1 (Sep. 20–24, 1998), pp. 103–104.

J.H.B. Nijhof, N.J. Doran, and W. Forysiak, INSPEC Abstract Number: A9820–4281–019, B9810–4125–058: "Energy enhancement of dispersion–managed solitons for strong dispersion maps", *OFC '98 Technical Digest*, vol. 2 IEEE Cat. No. 98CH361177, p. ThC4/268.

J.H.B. Nijhof, N.J. Doran, W. Forysiak, and A. Berntson, INSPEC Abstract Number: B9805–6260–088: "Energy enhancement of dispersion–managed solitons and WDM", *Electronics Letters*, vol. 34, No. 5 (Mar. 5, 1998), pp. 481–482.

J.H.B. Nijhof, N.J. Doran, W. Forysiak, and F.M. Knox, INSPEC Abstract Number: A9723–4281–012, B9712–6260–048 :"Stable soliton–like propagation in dispersion managed systems with net anomalous, zero and normal dispersion", *Electronics Letters*, vol. 33, No. 20 (Sep. 25, 1997), pp. 1726–1727.

J.H.B. Nijhof, W. Forysiak, and N.J. Doran, INSPEC Abstract Number: A1999–03–4280S–022, B1999–02–6260V–029: "Dispersion–managed solitons in the normal dispersion regime: a physical interpretation", *Optics Letters*, vol. 23, No. 21 ( Nov. 1, 1998), pp. 1674–1676.

J.H.B. Nijhof, W. Forysiak, and N.J. Doran, INSPEC Abstract Number: A2000–16–4265S–009, B2000–08–4340S–007: "The averaging method for finding exactly dispersion–managed solitons", *IEEE Journal of Selected Topics in Quantum Electronics*, vol. 6, No. 2 (Mar./Apr. 2000), pp. 330–336.

C. Paré, A. Villeneuve, P.–A. Bélanger, and N.J. Doran, INSPEC Abstract Number: A9611–4265J–004, B9606–4340–090: "Compensating for dispersion and the nonlinear Kerr effect without phase conjugation", *Optics Letters*, vol. 21, No. 7 (Apr. 1, 1996), pp. 459–461.

C. Paré, A. Villeneuve, P.–A. Bélanger, and N.J. Doran, INSPEC Abstract Number: A9709–4280S–018, B9705–6260–040, "Dispersion and self–phase modulation compensation based on a negative nonlinearity", *Technical Digest Series*, vol. 6 (1996), pp. IthA7–1/598–IthA7–4/601.

I.S. Penketh, P. Harper, S.B. Alleston, A.M. Niculae, I. Bennion, and N.J. Doran, INSPEC Abstract Number: A1999–17–4280S–034, B1999–09–6260–009: "10–Gbit/s dispersion–managed soliton transmission over 16,500 km in standard fiber by reduction of soliton interactions", *Optics Letters*, vol. 24, No. 12 (Jun. 15, 1999), pp. 802–804.

L.J. Richardson, W. Forysiak, and N.J. Doran, Inside Conference Item ID: CN037962909: "320 Gbit/s Single Channel Transmission OVER 4,500 Km Using Short Period Dispersion Management", 26th European Conference on Optical Communication (2000), vol. 3, pp. 187–188 VDE.

L.J. Richardson, W. Forysiak, and N.J. Doran, INSPEC Abstract Number: A1001–01–4265S–023, B2001–01–4340S–016: Energy enhancement of short–period dispersion–managed solitons, cleo 2000, *TOPS*, vol. 39, IEEE Cat. No. 00CH37088, pp. 32–33.

L.J. Richardson, W. Forysiak, and N.J. Doran, INSPEC Abstract Number: A2000–19–4265S–004, B2000–10–4340S–003: "Dispersion–managed soliton propagation in short–period maps", *Optics Letters*, vol. 25, No.14 (Jul. 2000), pp. 1010–1012.

L.J. Richardson, W. Forysiak, and N.J. Doran, INSPEC Abstract Number: B2001–05–6260–011: "Trans–oceanic 160 Gb/s single–channel transmission using short–period dispersion management", *IEEE Photonics Technology Letters*, vol. 13, No. 3 (Mar. 2001), pp. 209–211.

L.J. Richardson, W. Forysiak, N.J. Doran, and K.J. Blow INSPECT Abstract Number, B2001–07–6260–016: "Long–haul ultra high–speed transmission using dispersion managed solitons", *IEICE Trans. Electron.*, vol. E84–C, No. 5 (May 2001), pp. 533–540.

L.J. Richardson, W. Forysiak, N.J. Doran, and K.J. Blow, INSPEC Abstract Number: B2001–08–6260C–032: "Long–haul ultra high–speed transmission using dispersion managed solitons", *IEICE Trans. Commun.*, vol. E84–B, No. 5 (May 2001), pp. 1159–1166.

N.J. Smith and N.J. Doran, INSPEC Number: A9612–4281–009, B9607–4125–008: "Modulational instabilities in fibers with periodic dispersion management", *Optics Letters*, vol. 21, No. 8 (Apr. 15, 1996), pp. 570–572.

N.J. Smith and N.J. Doran, INSPEC Abstract Number: B9510–6260–179: "Gordon–Haus jitter suppression using a single phase modulator in long span soliton systems", *ECOC '95*, 20th European Conference on Optical Communication, vol. 1, pp. 241–244.

N.J. Smith, Doran, and W. Forysiak, INSPEC Abstract Number: A9609–4280S–013, B9605–6260–075: "Gordon–Haus jitter suppression using an intra–span phase modulator and post transmission dispersion compensator", *IEEE Photonics Technology Letters*, vol. 8, No. 3 (Mar. 1996), pp. 455–457.

N.J. Smith, N.J. Doran, W. Forysiak, F.M. Knox, INSPEC Abstract number: A9723–4281–005, B9712–4125–007: "Soliton transmission using periodic dispersion compensation", *Journal of Lightware Technology*, vol. 15, No. 10 (Oct. 1997), pp. 1808–1822.

N.J. Smith, N.J. Doran, F.M. Knox, and W. Forysiak, INSPEC Abstract Number: A9707–4265S–010, B9704–4340–042: "Energy–scaling characteristics of solitons in strongly dispersion–managed fibers", *Optics Letters*, vol. 21, No. 24 (Dec. 15, 1996), pp. 1981–1983.

N.J. Smith, W. Forysiak, and N.J. Doran, INSPEC Abstract Number: B9701–6260–010: "Reduced Gordon–Haus jitter due to enhanced power solitons in strongly dispersion managed systems", *Electronics Letters*, vol. 32, No. 22 (Oct. 24, 1996), pp. 2085–2086.

N.J. Smith, W. Forysiak, and N.J. Doran, INSPEC Abstract Number: B9808–6260–182: "Gordon–Haus jitter reduced in enhanced power soliton systems", *OFC '97 Technical Digest*, Cat. No. IEEE Cat. No. 97CH36049, vol. 6, p. 309.

N.J. Smith, F.M. Knox, N.J. Doran, K.J. Blow, and I. Bennion, INSPEC Abstract Number: B9603–6260–093: "Enhanced power solitons in optical fibres with periodic dispersion management", *Electronics Letters*, vol. 32, No. 1 (Jan. 4, 1996), pp. 54–55.

N.J. Smith, F.M. Knox, N.J. Doran, K.J. Blow, and I. Bennion, INSPEC Abstract Number: A9612–424265S–014, B9607–4340–037: "Dispersion management of optical fibre solitons", IEE Colloquium on Optical Solitons: Principles and Applications (Digest No. 1996/090) (1996), pp. 6/1–6/5.

M. Suzuki, N. Edgawa, I. Morita, S. Yamamoto, H. Taga, and S. Akiba, "Multi–Ten Gbit/s Soliton Transmission Over Transoceanic Distances", Physics and Applications of Optical Solitons in Fibres '95: Proceedings of the Symposium held in Kyoto, Japan (Nov. 14–17, 1995), pp. 375–391.

M. Suzuki, I. Morita, N. Edgawa, S. Yamamoto, H. Taga, and S. Akiba, "Reduction of Gordon–Haus timing jitter by periodic dispersion compensation in soliton transmission", *Electronics Letters*, vol. 31, No. 23 (Nov. 9, 1995), pp. 2027–2029.

M. Suzuki, I. Morita, S. Yamamoto, N. Edagawa, H. Taga, and S. Akiba: "Timing jitter reduction by periodic dispersion compensation in soliton transmission", *Optical Fibre Communications (OFC'95)*, Opt. Soc. Am., Washington, D.C. (1995), Paper PD20–1/401–PD20–4/404.

S.K. Turitsyn, N.J. Doran, J.H.B. Nijhof, V.K. Mezentsev, T. Schäfer, and W. Forysiak, Inside Conference Item ID: CN037481040: "Dispersion–Managed Solitons", Centre de Physics—Publications (1999), Springer, No. 12, pp. 91–115.

S.K. Turitsyn, N.J. Doran, E.G. Turitsyna, E.G. Shapiro, and M.P. Fedoruk, INSPEC Abstract Number: A2001–01–4265S–022, B2001–01–4340S–015: "Soliton interaction in optical communication systems with short–scale dispersion management", CLEO 2000, *TOPS*, vol. 39, IEEE Cat. No. 00CH37088, pp. 30–31.

S.K. Turitsyn, N.J. Doran, E.G. Turitsyna, E.G. Shapiro, M.P. Fedoruk, and S.B. Medvedev, Inside Conference Item ID: CN036434946: "Optical communication Systems with Schort–Scale Dispersion Management", Solid State Science and Technology Library (2000), vol. 6, pp. 235–251.

S.K. Turitsyn, M.P. Fedoruk, N.J. Doran, and W. Forysiak, INSPEC Abstract Number: B2000–08—6260F–006: "Optical Soliton transmission in fiber lines with short–scale dispersion management", *ECOC '99*, vol. 1 (Sep. 26–30, 1999), pp. 382–383.

S.K. Turitsyn, M.P. Fedoruk, W. Forysiak, and N.J. Doran, INSPEC Abstract Number: A2000–02–4280S–029, B2000–01–6260C–071: "Dispersion–management in fiber communication lines using Raman amplification", *Optics Communications*, vol. 170, Nos. 1–3 (Oct. 15, 1999), pp. 23–27.

S.K. Turitsyn, J.H.B. Nijhof, V.K. Mezentsev, and N.J. Doran, INSPEC Abstract Number: A2000–04–4281–014, B2000–02–4125–089: "Symmetries, chirp–free points, and bistability in dispersion–managed fiber lines", *Optics Letters*, vol. 24, No. 24 (Dec. 15, 1999), pp. 1871–1873.

* cited by examiner

OPTICAL COMMUNICATION SYSTEMS

This is a continuation of application Ser. No. 08/971,981, filed Nov. 17, 1997 now U.S. Pat. No. 6,097,524 which is a continuation of International Application PCT/GB96/01172 filed May 16, 1996.

1. FIELD OF THE INVENTION

2. Back Ground of Related Art

This relates to optical communication systems and finds particular application to optical communication systems for long distance operation or trans-oceanic applications.

Currently a great deal of work is being done on soliton propagation for such above mentioned systems. However, such soliton systems suffer from Gordon-Haus timing jitter. Return-to-zero (RZ) pulses are desired as they are compatible with the all-optical processing technologies envisaged for switching nodes and routing devices.

SUMMARY OF THE INVENTION

We have found that RZ pulse propagation may be advantageously employed where the average dispersion is near zero in a single amplifier span, thus reducing the timing jitter, with the use of a saturable absorber to maintain the pulse shape.

According to the present invention there is provided a return-to-zero pulse optical communication system including fast saturable absorber means with propagation near the average dispersion zero wavelength.

BRIEF DESCRIPTION OF THE DRAWINGS

Embodiments of the invention will be particularly described with reference to the accompanying drawings in which.

DETAILED DESCRIPTION OF THE PREFERRED EMBODIMENT

Figure 1:
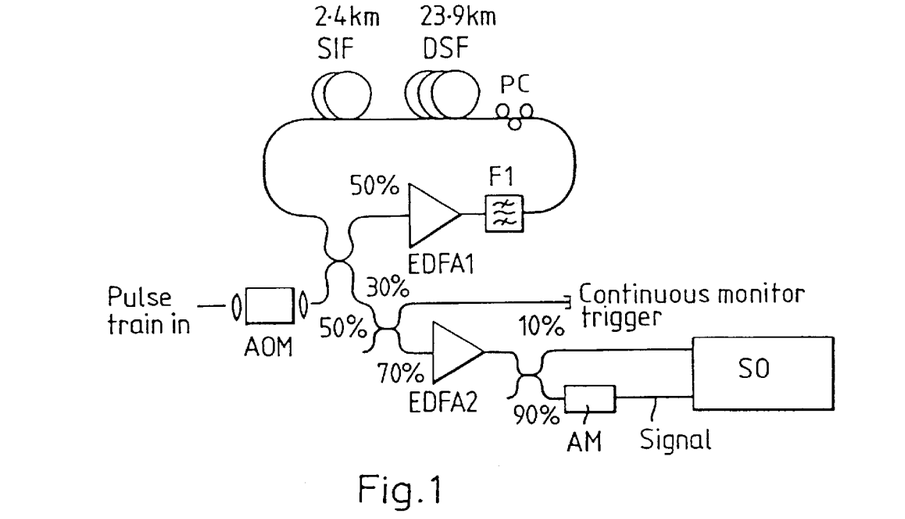
FIG. 1 is a diagram showing an optical fibre transmission system.

FIG. 1 of the drawings shows an arrangement in which signals are passed by way of an acousto-optic modulator AOM and a four-port coupler to a recirculating loop L including erbium-doped fibre amplifier EDFA1. Measurements were made using 23.9 km of dispersion shifted fibre (DSF) with a dispersion zero $\lambda_0$=1556 nm and 2.4 km of standard telecommunications step-index fibre (SIF). This combination gave a net dispersion zero over a single amplifier span at 1537 nm and a loop fill time of 125.6 μs. The saturable absorber mechanism used was that of nonlinear polarisation rotation (NPR) in the transmission fibre with the polarising element being a 3 nm Fabry-Perot bandpass filter F1. The filter was measured as having a −1.5 dB polarisation dependent loss. A polarisation controller PC was included to set the required polarisation state. Measurements were made using a sampling oscilloscope SO fed through a second erbium-doped fibre amplifier EDFA2 and a lithium niobate amplitude modulator AM. The numerals represent the signal splits at the various ports.

Figure 3:
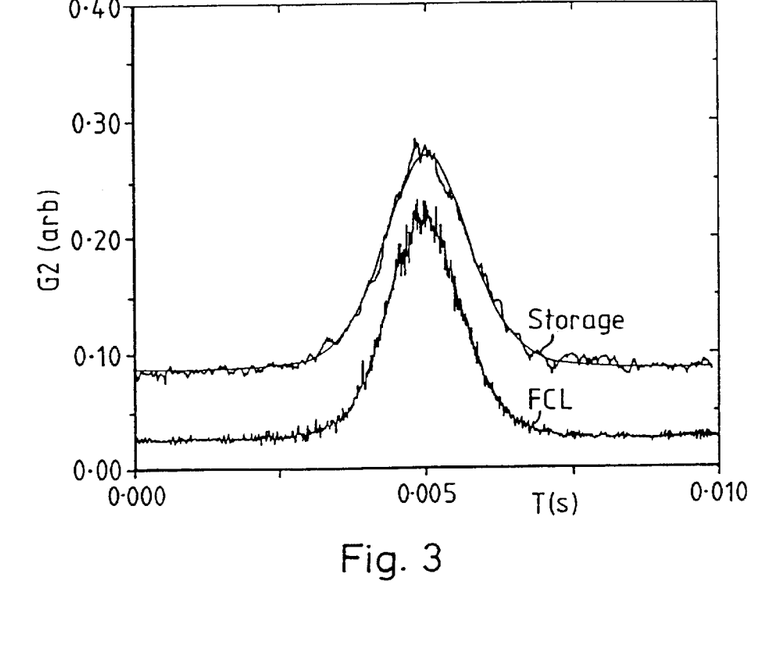
FIG. 3 shows autocorrelation traces of input and "stored" pulses with $sech^2$ curve fits.
Figure 4:
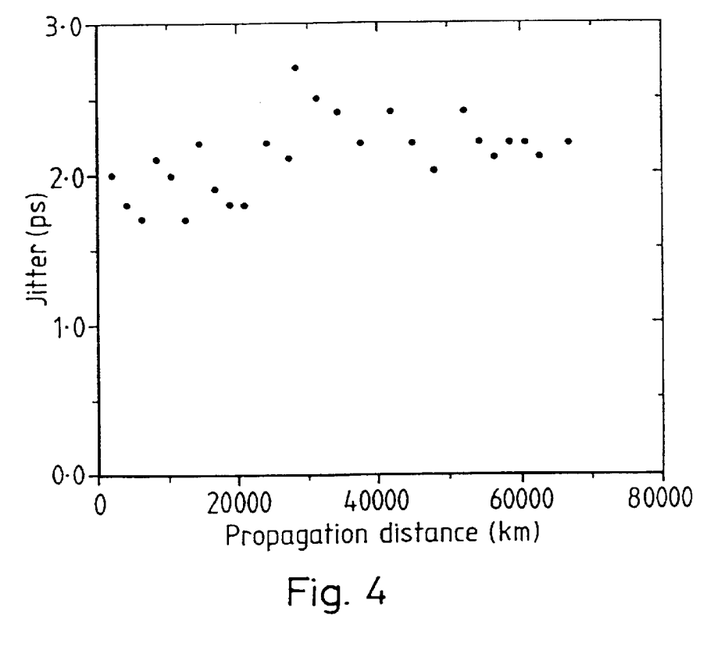
FIG. 4 shows standard deviation σ of timing jitter averaged over 1000 km against distance.

A 123.6 ps pulse train from an F-centre laser operating at 76 MHZ was injected into the recirculating loop. It was found that with the appropriate polarisation setting the amplified spontaneous emission (ASE) noise level could be made to saturate with distance, to the point that signal propagation could be "stored" virtually indefinitely to produce a return-to-zero pulse 'storage ring'. Although slightly broadened from 9.5 ps to 11 ps (FWHM), the pulses remained a good approximation to the input $sech^2$ profile (see FIG. 3). These pulses could be maintained in shape for >½H, this being limited only by environmental changes. With the input signal wavelength centred on the average $\lambda_0$ of the transmission line, the observed timing jitter did not appear to increase significantly with distance as shown in FIG. 4, for up to 70 Mm. The loop control electronics could be disabled effectively to produce an RZ pulse "storage ring" as even after 7 seconds (~1450 Mm), σ was only 8 ps. For longer signal wavelengths the jitter increased significantly. The average power level within the loop was far in excess of that expected for fundamental solitons.

Figure 2:
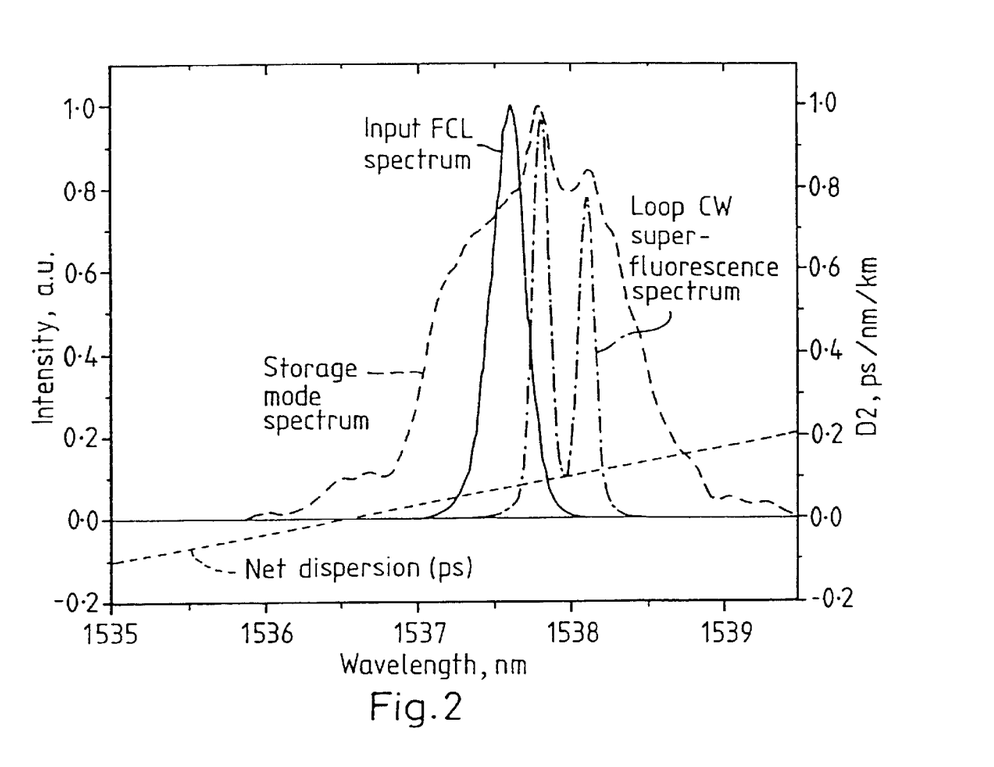
FIG. 2 is a diagram showing various spectra.

FIG. 2 shows the various spectra of the input FCL pulses, the recirculating loop superfluorescence (no signal injection) and the loop output when running as a storage ring The input pulses, which were injected at 1537.3 nm, spectrally broadened until reaching the stable spectra shown for the storage ring. The two peaks in this spectrum correspond to those of the loop superfluorescence and are the result of the polarisation dependence of the filter. The average power at the end of the transmission fibre was 71 μW. Taking the dispersion for the pulse centre wavelength to be 0.1 ps/nm/km, the corresponding expected soliton power is only 0.65 μW. Thus this cannot be purely average soliton propagation, since for N≈10 solitons, the signal will tend to break up after only a short transmission due to the onset of self-Raman shift. These comparatively high optical powers lead, through self-phase modulation, to the large spectral broadening shown.

Operating in this regime, the observed timing jitter did not appear to increase significantly over global distances, as shown in FIG. 4 for up to 70 Mm. Indeed, even after 7 s (−1450 Mm), the measured standard deviation of the timing jitter a was only 8ps. (Owing to the low repetition rate, the accumulated jitter over 1000 km following the required propagation distance was measured to reduce the acquisition time.) As the trigger for these jitter measurements was taken optically from a neighbouring pulse and, thus, also jittered, these values are an overestimate by a factor of √2. For longer signal wavelengths, the jitter increased significantly with propagation distance.

When operated as a storage ring, the amplifier pump power could be lowered to remove some pulses from the stored train, effectively imposing data on the recirculating loop. These remaining pulses would be supported at these or higher pump powers. Data storage is therefore possible with such an arrangement.

In summary we have demonstrated a novel RZ pulse propagation mode with the use of NPR as a saturable absorber combined with operation at the AO of the loop (average zero dispersion over one amplifier spacing) and the propagation of ~10 ps pulses over 10's Mm with no significant increase in timing jitter. This result indicates that data rates >10 Gbit/s will be sustainable for almost indefinite distances using such techniques.

What is claimed is:

1. A return to zero optical communication system for long distance operation comprising:
   an amplifier span, the amplifier span comprising, an optical amplifier, and
   first and second sections, the first section comprising:
   a length of optical fiber, and
   the second section comprising a dispersion reducer, the dispersion reducer adapted to reduce net dispersion toward zero in the amplifier span for reducing timing jitter, and a fast saturable absorber adapted to maintain a pulse shape, wherein said fast saturable absorber comprises said length of optical fiber, exhibiting non-linear polarization rotation, and a polarization element.

2. An optical communication system according to claim 1 wherein the fast saturable absorber provides a relatively low power loss between high optical powers and low optical powers.

3. An optical communication system according to claim 2, wherein the fast saturable absorber provides a 1.5 dB loss between a high absorption state and low absorption state.

4. An optical communication system according to claim 3, further comprising:

a polarization controller adapted to set the polarization state of the fiber.

5. An optical communication system according to claim 1, wherein said length of optical fiber is a stepped index fiber and the second section is a dispersion shifted length of optical fiber.

6. An optical communication system according to claim 1, wherein said polarization element comprises a Fabry-Perot band-pass filter.

7. An optical communication system according to claim 1, wherein said polarization element selectively transmits light having a first polarization angle and attenuates light having a second polarization angle.

8. A return to zero optical communication system for long distance operation comprising:

an amplifier span, the amplifier span comprising:

an optical amplifier, first and second sections, the first section comprising a length of optical fiber and the second section comprising a dispersion reducer, the dispersion reducer adapted to reduce net dispersion toward zero in the amplifier span for reducing timing jitter; and a fast saturable absorber adapted to maintain a pulse shape, wherein the fast saturable absorber provides a relatively low power loss between high optical powers and low optical powers.

9. An optical communication system according to claim 8, wherein the fast saturable absorber provides a 1.5 dB loss between high and low absorption states.

10. An optical communication system according to claim 8, wherein the fast saturable absorber comprises said length of optical fiber, exhibiting non-linear polarization rotation, and a polarization element.

11. An optical communication system according to claim 10, wherein the polarization element comprises a Fabry-Perot band-pass filter.

12. An optical communication system according to claim 8 further comprising a polarization controller, wherein said polarization controller sets the polarization state of the fiber.

13. An optical communication system according to claim 8, wherein said length of optical fiber is a stepped index fiber and the dispersion reducer is a dispersion shifted length of optical fiber.

14. A return to zero optical communication system for long distance operation comprising an amplifier span, the amplifier span comprising an optical amplifier, a first section comprising a length of optical fiber exhibiting non-linear polarization rotation, a second section comprising means for reducing net dispersion toward zero in the amplifier span to reduce timing jitter, and a fast saturable absorber adapted to maintain a pulse shape, wherein said fast saturable absorber comprises the length of optical fiber and a polarization element.

15. An optical communication system according to claim 14, wherein the polarization element comprises a Fabry-Perot band-pass filter.

16. An optical communication system according to claim 14, further comprising:

a polarization controller.

17. An optical communication system according to claim 14, wherein the length of optical fiber comprises a stepped index fiber.

18. An optical communication system according to claim 14, wherein the means for reducing net dispersion comprises a dispersion-shifted length of optical fiber.

19. A return to zero optical communication system for long distance operation comprising an amplifier span, the amplifier span comprising an optical amplifier, a first section comprising a length of optical fiber, a second section comprising means for reducing net dispersion toward zero in the amplifier span to reduce timing jitter, and a fast saturable absorber adapted to maintain a pulse shape, wherein the fast saturable absorber provides a relatively low power loss between high optical powers and low optical powers.

20. An optical communication system according to claim 19, wherein the length of optical fiber comprises a stepped index fiber.

21. An optical communication system according to claim 19, wherein the means for reducing net dispersion comprises a dispersion-shifted length of optical fiber.

22. An optical communication system according to claim 19, wherein the length of optical fiber exhibits nonlinear polarization rotation and the fast saturable absorber comprises the length of optical fiber and a polarization element.

23. An optical communication system according to claim 22, wherein the polarization element comprises a Fabry-Perot band-pass filter.

24. An optical communication system according to claim 22, further comprising:

a polarization controller.

25. An optical communication system section comprising at least one amplifier span, the amplifier span comprising:

an optical amplifier;

a saturable absorber; and a dispersion reducer adapted to reduce the net dispersion in the amplifier span toward zero.

26. An optical communication system section according to claim 25, wherein the amplifier span further comprises a section of optical fiber.

27. An optical communication system section according to claim 25, wherein the saturable absorber is a fast saturable absorber.

28. An optical communication system section according to claim 25, wherein the saturable absorber comprises a non-linear polarization rotator and a polarizing element.

29. An optical communication system section according to claim 28, wherein the non-linear polarization rotator comprises a section of optical fiber.

30. An optical communication system section according to claim 29, wherein the section of optical fiber is a dispersion shifted fiber.

31. An optical communication system section according to claim 28, wherein the polarizing element comprises an optical bandpass filter.

32. An optical communication system section according to claim 31, wherein the optical bandpass filter is an optical Fabry/Perot bandpass filter.

33. An optical communication system section according to claim 25, wherein the optical communication system section is part of a return-to-zero optical communication system.

34. A method of optical communication comprising:
    transmitting an optical pulse through at least one amplifier span,
    wherein transmitting the optical pulse through the at least one amplifier span includes transmitting the optical pulse through an optical amplifier, a saturable absorber, and a dispersion reducer, such that the dispersion reducer reduces the net dispersion of the amplifier span toward zero for the optical pulse.

* * * * *